United States Patent
Doyle (10) Patent No.: US 8,467,992 B1
(45) Date of Patent: Jun. 18, 2013

(54) VISION BASED LOCATION AND MEASUREMENT DEVICE AND METHODS

(75) Inventor: Joseph D. Doyle, St. Charles, MO (US)

(73) Assignee: The Boeing Company, Chicago, IL (US)

(*) Notice: Subject to any disclaimer, the term of this patent is extended or adjusted under 35 U.S.C. 154(b) by 377 days.

(21) Appl. No.: 12/882,683

(22) Filed: Sep. 15, 2010

(51) Int. Cl.
  G01B 21/20 (2006.01)
  G01B 21/30 (2006.01)
  G06F 17/40 (2006.01)
  G06F 19/00 (2011.01)

(52) U.S. Cl.
  USPC ............ 702/167; 33/546; 73/105; 73/865.8; 702/81; 702/187; 702/189; 708/442

(58) Field of Classification Search
  USPC ............ 33/501, 503, 533, 545, 546; 73/104, 73/105, 865.8; 250/200, 559.01, 559.19, 250/559.22, 559.23, 559.29, 559.31, 559.38; 356/2, 3, 237.1, 237.2, 237.3, 237.4, 237.5, 356/450, 496, 498, 511, 600, 614; 382/100, 382/106, 108, 141; 702/1, 33, 34, 35, 81, 702/82, 84, 127, 150, 152, 153, 155, 167, 702/168, 187, 189; 708/100, 105, 200, 442
  IPC ... B23C 9/00; B23Q 17/00,17/20; G01B 11/00, G01B 11/24, 11/30, 5/00, 2/20, 5/28, 21/00, G01B 21/20, 21/30; G06F 11/00, 11/30, G06F 11/32, 17/00, 17/40, 19/00
  See application file for complete search history.

(56) References Cited

U.S. PATENT DOCUMENTS

| | | | | |
|---|---|---|---|---|
| 2,580,151 A * | 12/1951 | Batchelder | .................... | 702/150 |
| 3,137,854 A * | 6/1964 | Anderson | ..................... | 342/463 |
| 3,231,726 A * | 1/1966 | Williamson | .................. | 708/442 |
| 3,355,590 A * | 11/1967 | Bertram | ........................ | 250/202 |
| 3,424,531 A * | 1/1969 | Owens et al. | .................. | 356/4.1 |
| 3,523,736 A * | 8/1970 | Stafford | ........................ | 356/614 |
| 3,531,868 A * | 10/1970 | Stevenson | ........................ | 33/503 |
| 3,885,875 A * | 5/1975 | Rosenfeld et al. | ............ | 356/369 |
| 3,981,010 A * | 9/1976 | Michelsen | ...................... | 342/55 |
| 5,307,151 A | 4/1994 | Hof et al. | | |
| 5,969,822 A * | 10/1999 | Fright et al. | .................. | 356/608 |
| 6,268,923 B1 | 7/2001 | Michniewicz et al. | | |
| 6,438,272 B1 | 8/2002 | Huang et al. | | |
| 7,286,246 B2 | 10/2007 | Yoshida | | |
| 7,768,656 B2 | 8/2010 | Lapa et al. | | |
| 8,346,392 B2 * | 1/2013 | Walser et al. | ................. | 700/259 |
| 2010/0274390 A1 * | 10/2010 | Walser et al. | ................. | 700/259 |
| 2010/0318319 A1 * | 12/2010 | Maierhofer | ................... | 702/150 |

* cited by examiner

Primary Examiner — Edward Cosimano
(74) Attorney, Agent, or Firm — Armstrong Teasdale LLP (57) ABSTRACT

A system for generating surface data defining a position and location of an object is described. The system includes a non-contact measuring device for measuring the location of one or more points on a surface of an object with respect to the measuring device, an optical imaging device for capturing image information, and a processor. The processor is programmed to use the captured image information to determine location and orientation data for both the measuring device and the optical imaging device with respect to a fixed point in space, receive location measurement data from the measuring device, and combine the location and orientation data with the location measurement data to generate surface data for the object.

20 Claims, 8 Drawing Sheets

VISION BASED LOCATION AND MEASUREMENT DEVICE AND METHODS

BACKGROUND

The field of the disclosure relates generally to measurement of objects, and more specifically, to a vision based location and measurement device and associated methods.

Device measurement methods have progressed over time. Originally, a manual measurement of a device would be utilized. An example of manual measurement is using a scale to measure the length of a part. A manual measurement method provides a measurement, but compared to other methods it is time consuming and can be inaccurate.

As technology progressed, other measurement devices, such as laser scanners, were developed. However, device measurements with a laser scanner generally require that tracking targets be applied to the target object. The various measurements to the tracking targets are utilized to determine a pose of the target object.

Laser scanner measurements with external tracking hardware are also known. Specifically, a laser scanner with external tracking hardware such as infrared cameras, photogrammetry cameras, or tracking lasers to determine are used to determine a pose of the target object.

An articulating arm measurement device is also known. The articulating arm measurement device is made up of several fixed length arms connected by rotating joints. The length of each arm is known and the angle between each arm is measured when the device is used to take a measurement of the object's surface. To take a measurement, a probe attached to the articulating arm is touched to the surface and the angle of each joint is used and the length of each arm is used to calculate the position of the probe.

Each of the above described device measurement methods is either time consuming or requires the utilization of additional hardware devices to make the distance measurements.

BRIEF DESCRIPTION

In one aspect, a system for generating surface data defining a position, and location of an object is provided. The system includes a non-contact measuring device for measuring the location of one or more points on a surface of an object with respect to the measuring device, an optical imaging device for capturing image information, and a processor programmed to use the captured image information to determine location and orientation data for both the measuring device and the optical imaging device with respect to a fixed point in space, receive location measurement data from the measuring device, and combine the location and orientation data with the location measurement data to generate surface data for the object.

In another aspect, a method for generating three axis surface data for an object is provided. The method includes determining location and orientation data for both a location measuring device and an optical imaging device with respect to a coordinate system associated with the fixed point in space, receiving data indicative of location measurements between the location measuring device and the object, and combining the data indicative of location measurements and the location and orientation data for the location measuring device and the optical imaging device to generate data representative of a surface of the object.

The features, functions, and advantages that have been discussed can be achieved independently in various embodiments or may be combined in yet other embodiments further details of which can be seen with reference to the following description and drawings.

DETAILED DESCRIPTION

The described embodiments relate to a camera and distance measuring device based method for generating surface data for an object that defines a pose (location and orientation) of the object. The embodiments operate to define points of interest of an object with respect to an origin, based on distance measurements made by the distance measurement device and image data captured by the camera. For example, a position of the distance measurement device with respect to the camera may be obtained using image data, transformed into camera coordinates, and both the measuring device position (in camera coordinates) and camera position (in camera coordinates) are transformed to be in coordinates associated with a fixed location. Once the location for the camera and distance measuring device are defined, distance measurements and image data are combined to define an object.

Figure 1:
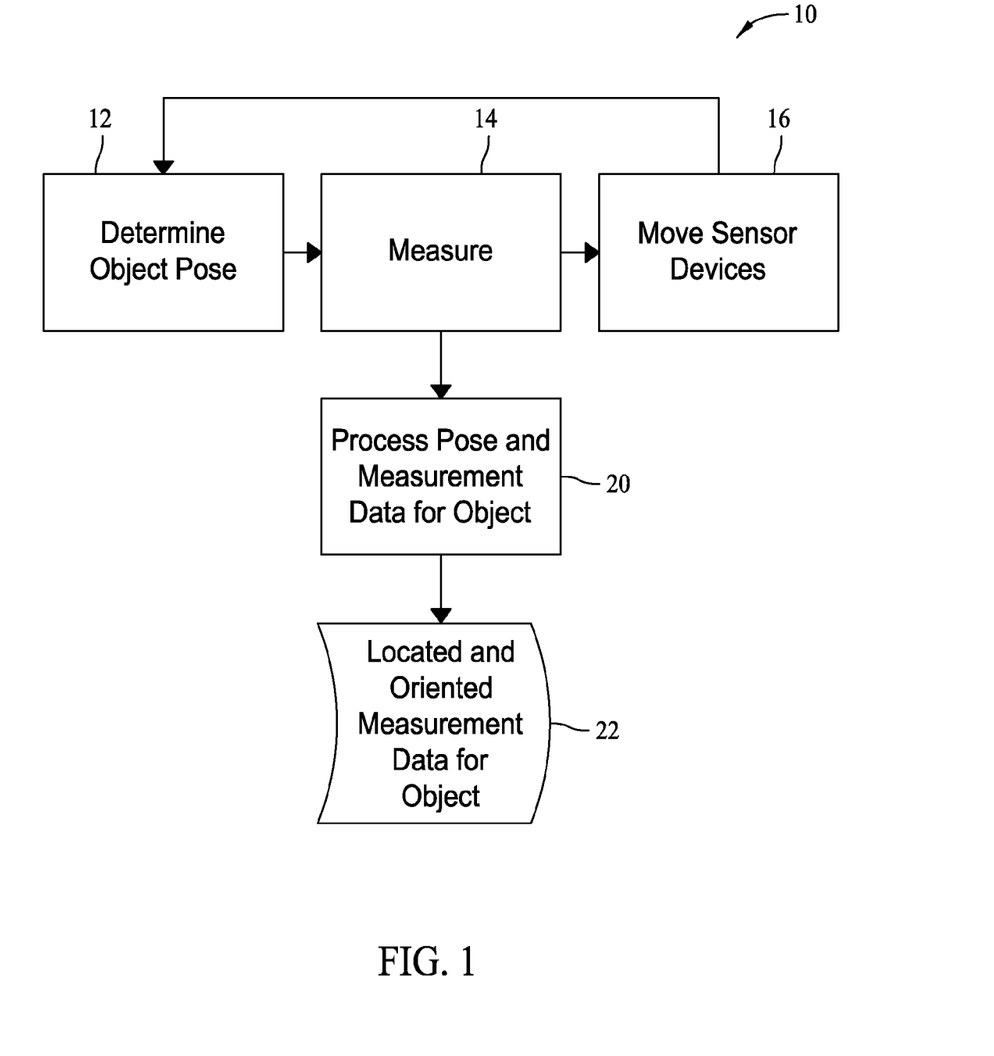
FIG. 1 is a flowchart of a camera and distance measuring device based method for determining location and orientation of an object.

Such a process is illustrated by the flowchart 10 of FIG. 1. Particularly, the embodiments relate to one or more of a distance measurement sensor utilized to measure the distance to an object and measurement of an object's surface along with a position determination for the distance measurement sensor, and combining such measurements to generate location and orientation data for the object. Three axis surface measurement information of objects is thus captured without the need for tracking targets or external tracking hardware. In one embodiment, a digital camera is utilized to determine 12 a pose of the distance measuring device and then the distance from the distance measuring device to a point on the surface of the target object is measured 14. One embodiment of a distance measuring device is a laser rangefinder. The camera and rangefinder are moved 16 and the pose determination 12 and range measurement 14 are repeated. Once a threshold of pose and distance measurement data are compiled, the combination of pose and distance data are combined 20 to create located and oriented measurements 22 that represent points on the surface of the target object.

As mentioned above, one specific embodiment includes a camera used to determine distance measuring device pose (location and orientation) without the need for external targets, while a laser rangefinder or laser-line scanner distance measuring device is utilized to take distance measurements. The ability to transfer such data to a computer is also utilized. The video, or image, data from the camera is used to determine pose of the distance measuring device. Then, the distance measuring device, such as a laser rangefinder, is used to measure the distance to the target object's surface. The distance to the object is combined with the device pose to create located measurements that define points on object's surface in specified coordinate system. The camera/distance measuring device combination is then moved to generate pose and distance data with respect to a different section of the target object's surface and the process of creating located measurements is repeated. The various located measurements of the target object's surface are combined to create a digital, three-dimensional representation of the target object. This digital, three-dimensional representation, in embodiments, takes the form of a point cloud containing the measured points that represent the object's surface. The process of taking a series of located measurements is sometimes referred to as "scanning" herein.

As further described herein, the camera/laser rangefinder allows for rapid collection of three-dimensional surface information from a target object, further allowing multiple regions of a target object to be measured discontinuously with the possibility of the discontinuous measurement sessions being merged into a single three-dimensional surface.

Figure 2:
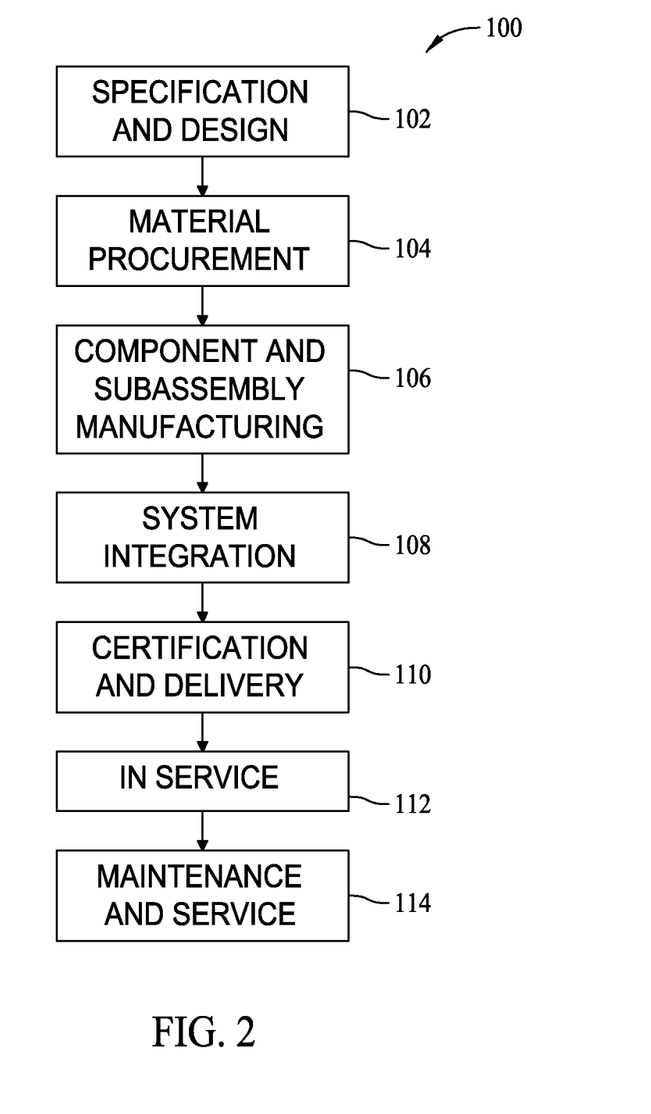
FIG. 2 is a flow diagram of an aircraft production and service methodology.
Figure 3:
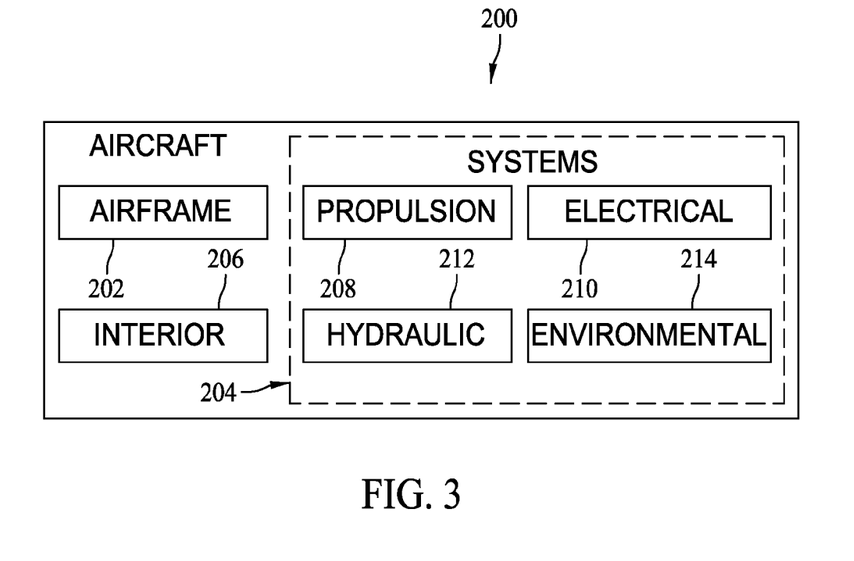
FIG. 3 is a block diagram of an aircraft.

Certain embodiments of the disclosure may be described in the context of aircraft manufacturing and service method 100 as shown in FIG. 2 and an aircraft 200 as shown in FIG. 3. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 3, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service 114 may be used during system integration 108 and/or maintenance and service 114 to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 4:
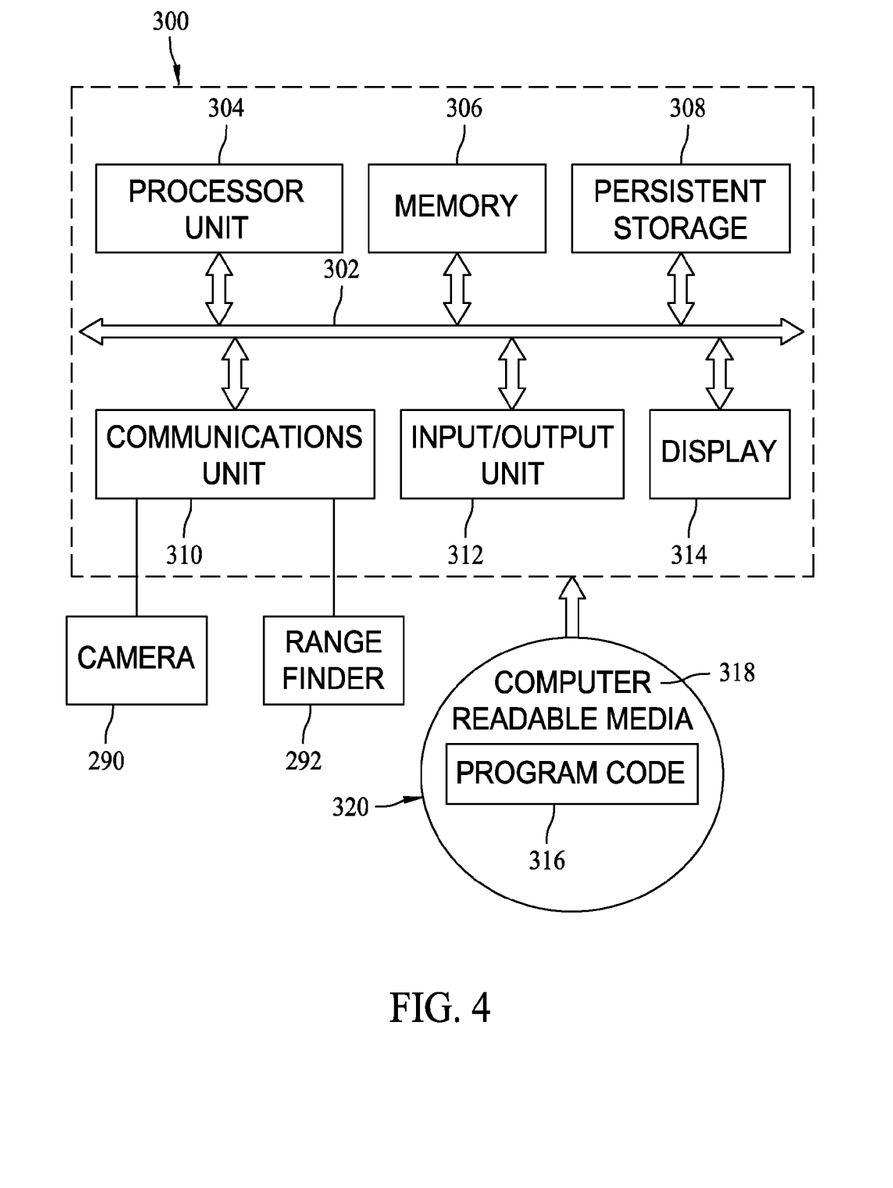
FIG. 4 is a diagram of a data processing system.

Turning now to FIG. 4, a diagram of a data processing system capable of communications with and receipt of data from one or both of a camera 290 and a rangefinder 292 is depicted in accordance with an illustrative embodiment. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece. of hardware that is capable of storing information either on a temporary basis and/or a permanent basis. Memory 306, in these examples, may be, for example, without limitation, a random access memory or any other suitable volatile or non-volatile storage device. Persistent storage 308 may take various forms depending on the particular implementation. For example, without limitation, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, without limitation, a removable hard drive may be used for persistent storage 308.

Communications unit 310, in these examples, provides for communications with other data processing systems or devices, for example, camera 290 and rangefinder 292. In one embodiment, communications unit 310 is a network interface card. Communications unit 310 may provide communications through the use of either or both physical and wireless communication links.

Input/output unit 312 allows for input and output of data with other devices that may be connected to data processing system 300. For example, without limitation, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non- tangible media, such as communications links or wireless transmissions containing the program code.

In some illustrative embodiments, program code 316 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 316 may be a server computer, a client computer, or some other device capable of storing and transmitting program code 316.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308 and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

As mentioned above, the above described system 300, including camera 290 and rangefinder 292 is operable for rapidly and accurately creating three dimensional digital representations of physical objects by taking a series of orientation and locating measurements with camera 290 and rangefinder 292 then using the computing capability of a system (such as system 300) to combine the measurements to generate location and orientation data. Since no tracking markers are used, such a device may be used to scan very large objects without interruption and with minimal preparation. Additionally, since tracking markers are not used, data relating to multiple sections of an object may be obtained separately and combined at a later time.

As referred to herein, the scanning device includes an imaging device such as camera 290, a measurement device such as rangefinder 292, and a computing device such as system 300.

Figure 5:
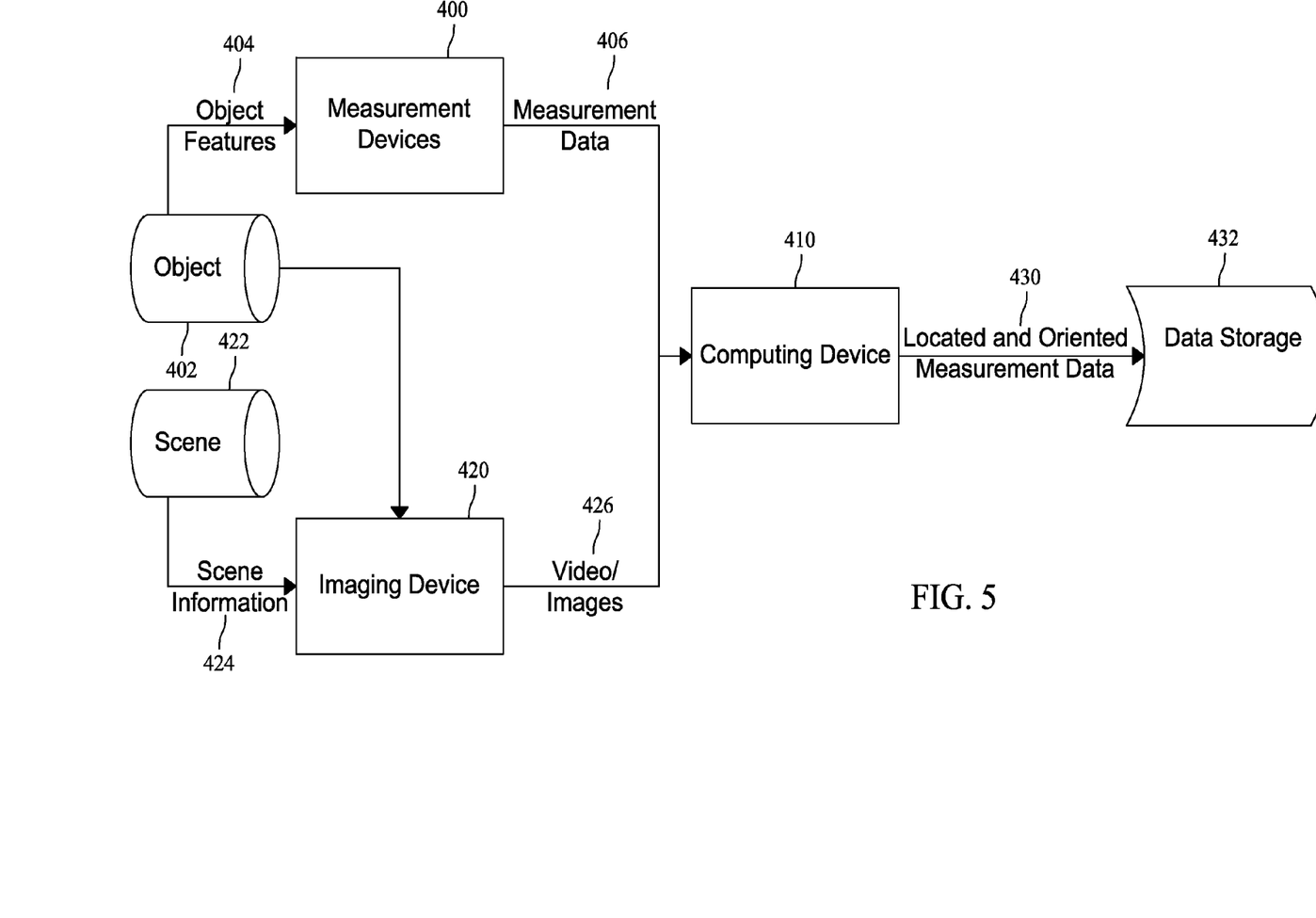
FIG. 5 is a data flow diagram illustrating the combination of data from a distance measuring device and an imaging device to determine location and orientation of an object.

Referring to FIG. 5, the measurement device 400 is used to determine the distance between the measurement device 400 and the surface of an object 402 which varies due to any object features 404 associated with the object 402. The output of the measurement device 400 is measurement data 406 which is sent to the computing device 410 for processing. In embodiments, measurement data 406 is generated with a laser rangefinder, though alternative embodiments include a LIDAR (Light Distancing and Ranging) device, a LADAR (Laser Distancing and Ranging) device, a laser line scanner, an ultrasonic rangefinder, or any other device or method used to determine a distance.

The imaging device 420 is used to capture the object 402 being scanned as well as the scene 422 surrounding the object 402, which is referred to herein as scene information 424. The output for the imaging device 420 includes one or both of images and video 426 which are provided to computing device 410 for processing. In an embodiment, computing device 410 serves two functions. The first function is to use the images and/or video 426 to determine the pose (e.g., location and orientation) of the device making the distance measurements using localization or tracking algorithms as well as a location and orientation of the imaging device 420.

The second function of computing device 410 is to determine a location of the surface of the object 402 by combining the location and orientation data, for both imaging device 420 and distance measurement device 400, with the distance measurement data 406. One output of computing device 410 is therefore located and oriented measurement data 430 associated with the object 402 which, for example, may be stored in a storage device 432 (e.g., memory 306 and/or persistent storage 308). In an embodiment, the computing device 410 is utilized to merge multiple measurements into a single, three-dimensional representation of the object's surfaces.

Figure 6:
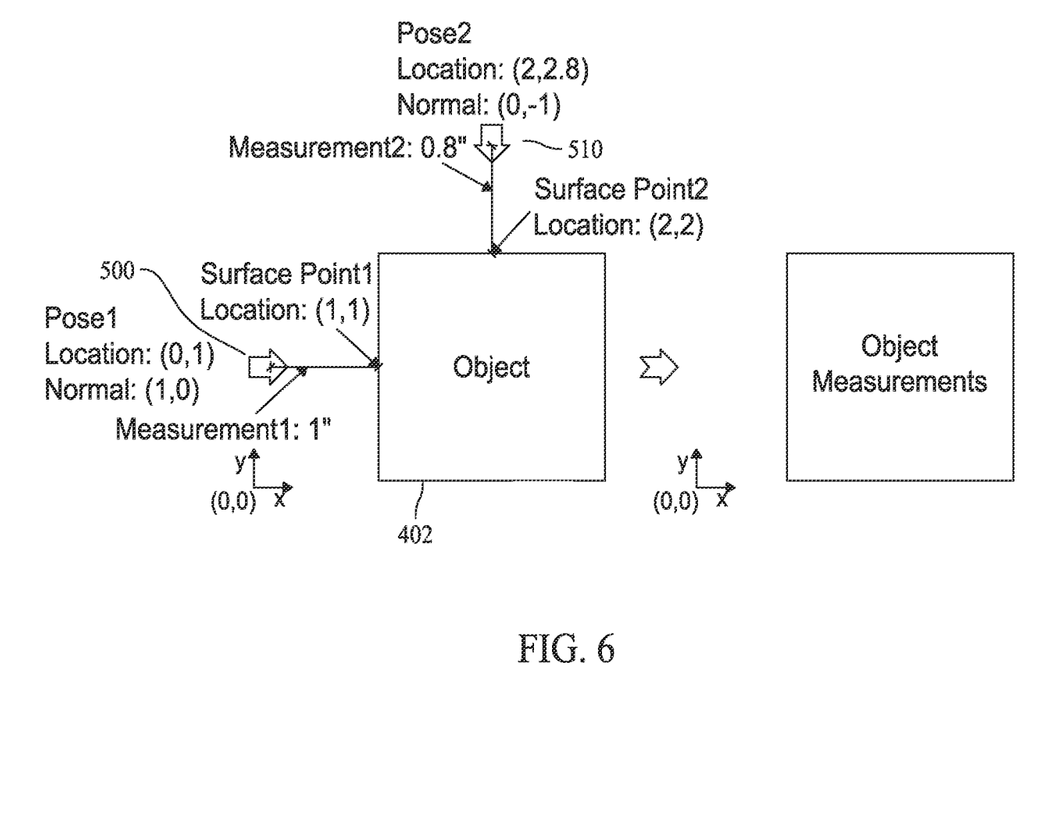
FIG. 6 is a diagram illustrating two measuring device poses (location and orientation) with respect to an object of interest.

A process for using the camera/distance measuring device combination includes determining a first pose 500 of the distance measuring device and imaging device 420, as shown in FIG. 6, using the above described imaging device 420. More specifically, captured image information is used to determine the location and orientation data for the optical imaging device, and therefore the distance measuring device, with respect to a fixed point in space. Once pose for the distance measuring device is determined, a measurement is recorded to determine the distance between the distance measuring device and a surface of the object 402. Next, the camera/distance measuring device combination is moved and the process is repeated, including determining a second pose 510 of the distance measuring device and imaging device 420. While the second pose 510 is being determined and new distance measurements are being recorded, the data related to the first pose 500 and measurement data acquired from the position of the first pose 500 are combined to create located and orientated measurement data. The process illustrated by FIG. 6 is repeated multiple times to allow for data representative of an object's surface to be rapidly generated.

Figure 7:
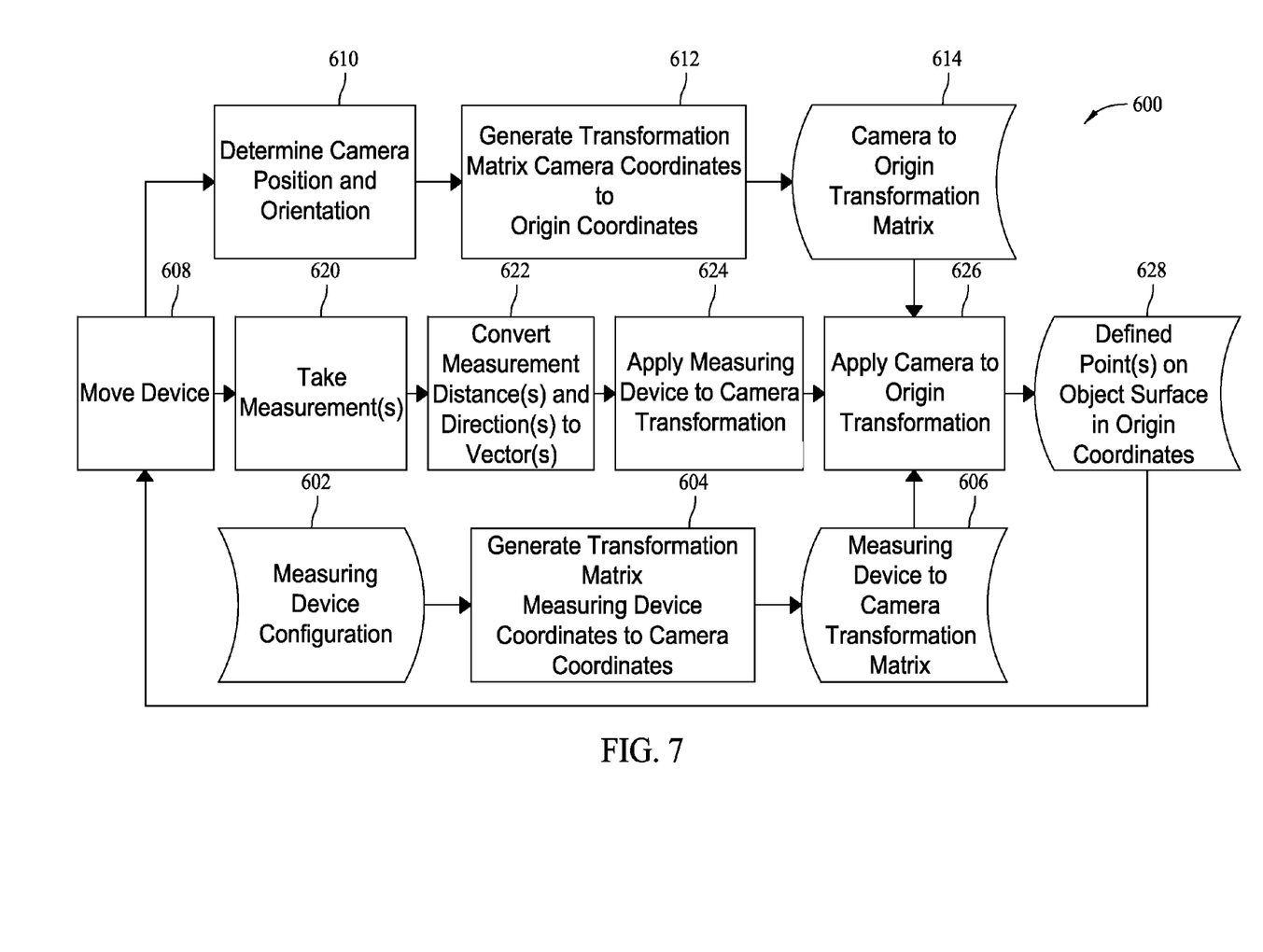
FIG. 7 is a flowchart illustrating a detailed process for using a camera/distance measuring device combination and combining location and orientation data to generate surface data for an object.

FIG. 7 is a flowchart 600 that further illustrates the process for using a camera/distance measuring device combination and combining location and orientation data to generate representative surface data for an object.

In one embodiment, measuring device configuration is an input. The configuration of the measuring device is used to determine 602 a position and orientation of the measuring device with respect to the camera. The position and orientation of the measuring device with respect to the camera are used to generate 604 a transformation matrix as shown.

$$A = \begin{bmatrix} R_{c11} & R_{c12} & R_{c13} & t_{cx} \\ R_{c21} & R_{c22} & R_{c23} & t_{cy} \\ R_{c31} & R_{c32} & R_{c33} & t_{cz} \\ 0 & 0 & 0 & 1 \end{bmatrix}$$

$R_{cij}$ represents rotation values between the measuring device coordinate system and the camera coordinate system and $t_{cj}$ represents translation values between the measuring device coordinate system and the camera coordinate system. In the embodiment described, a transformation (rotation and translation) matrix is utilized. However, other transformation techniques may be utilized to rotate coordinates, for example, quaternions or Euler angles.

The transformation matrix is used 606 to convert between measuring device coordinates and camera coordinates.

The measuring device is then moved 608 to a new position. Camera position and orientation is determined 610 with respect to an initial position or origin using, for example, the video from the camera and a process such as simultaneous localization and mapping (SLAM), parallel tracking and mapping, or other software capable of providing position and orientation without use of tracking markers.

The position and orientation of the camera with respect to the origin are used to generate 612 a transformation matrix of the form:

$$B = \begin{bmatrix} R_{o11} & R_{o12} & R_{o13} & t_{ox} \\ R_{o21} & R_{o22} & R_{o23} & t_{oy} \\ R_{o31} & R_{o32} & R_{o33} & t_{oz} \\ 0 & 0 & 0 & 1 \end{bmatrix}$$

$R_{cij}$ represents rotation values between the camera coordinate system and the origin coordinate system and $t_{oj}$ represents translation values between the camera coordinate system and the origin coordinate system and is used to convert 614 between camera coordinates and origin coordinates.

The measuring device is then used to measure 620 the distance and direction to one or more points on the surface of the object. The distances and directions are converted 622 to vector notation of the form:

$$\overline{m} = \begin{bmatrix} x \\ y \\ z \\ 1 \end{bmatrix}$$

x, y, and z represent the location of the point on the surface of the object in measuring device coordinates. Transformation is applied to convert 624 the measurement vector in measuring device coordinates to camera coordinates according to $\overline{m}'=A\overline{m}$, where $\overline{m}$ represents the measurement vector in measuring device coordinates, A represents the transformation matrix from measurement to camera coordinates, and $\overline{m}'$ represents the measurement vector in camera coordinates.

Another transformation is applied to convert 626 the measurement vector in camera coordinates to origin coordinates according to $\overline{o}=B\overline{m}'$ where $\overline{m}'$ represents the measurement vector in camera coordinates, B represents the transformation matrix from camera to origin coordinates, and $\overline{o}$ represents the measurement vector in origin coordinates.

The measurement vector in origin coordinates defines 628 the point on the surface of the object in origin coordinates. This defined point is stored and the measuring device is moved 608 and the above process is repeated as needed.

Figure 8:
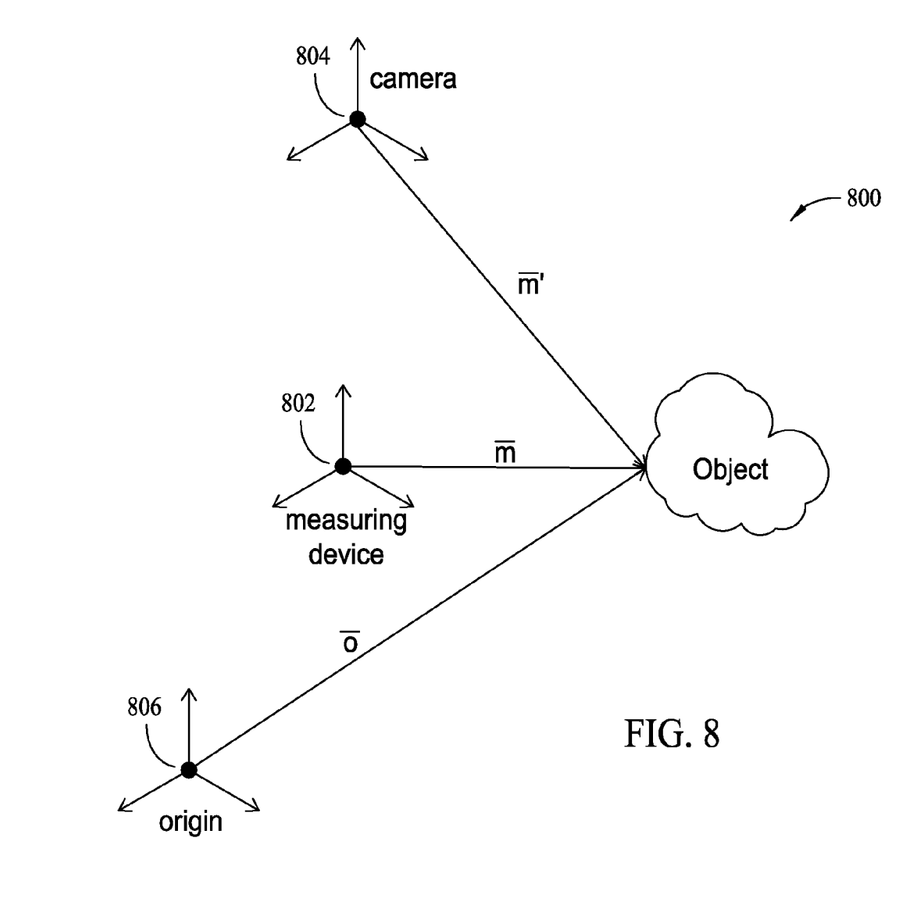
FIG. 8 is a diagram illustrating a coordinate system associated with each of a measuring device, a camera, and an origin.

FIG. 8 is a diagram 800 illustrating the three coordinate systems (measuring device, camera, and origin) described above, and further illustrating how the three coordinate systems are related. The measuring device coordinate system has an origin located at the point 802 where the measurement is initiated. The camera measuring device has an origin 804 located at the point defined by the optical tracking software. The origin coordinate system has an origin 806 located, and fixed, at a specified point for one or more measurements. Multiple sets of measurements using different origins could be combined into a single representation of an object if the relationship (distance and orientation) between the multiple origins is known as is described above.

The above described embodiments provide data representative of the surface of an object while not requiring the attachment of tracking targets to the object, and therefore provide several benefits over known measurement methods. For example, manual measurement using devices such as rulers is only feasible for small areas of simple geometry. The embodiments allow for measurement over a large area and are capable of measuring complex geometry.

The removal of tracking targets provides the following benefits over laser scanning devices combined with tracking targets applied to the target object. For example, an object can be scanned without first applying tracking markers resulting in significantly reduced setup time, a scan can be completed without removing applied tracking markers resulting in significantly reduced cleanup time, a large object can be scanned without stopping to apply more tracking markers outside the initial scan area, and the scan area can be increased without the need for applying additional tracking markers.

Additionally, the described embodiments allow data representative of the entire surface of an object to be generated. Tracking markers cover the surface and the surface underneath the tracking markers is estimated by interpolating the surface surrounding the tracking marker. If a tracking marker is accidentally placed over a hole, pit, or other surface feature the interpolation will treat the area beneath the marker as a smooth surface. Removal of tracking markers from the process eliminates the risk of tracking markers being left on the object resulting in the object being contaminated with foreign objects. Foreign objects are a major concern and risk for the aerospace industry. Removal of tracking markers from the process also eliminates the need for three or more tracking markers to be visible for scanning, allowing the scanner to be more easily used in small regions where it may be difficult to view, or place, three or more tracking markers.

Removal of external tracking hardware utilized in combination with a measurement device such as a laser scanner also provides benefits. For example, an object can be scanned without first setting up external tracking hardware resulting in reduced setup time, a scan can be completed without taking down external tracking hardware resulting in reduced cleanup time, and no external tracking hardware is required resulting in a lower cost system. Additionally, a large object can be scanned without stopping to move external tracking hardware to allow for scanning outside the initial scan area, the scan area can be increased without the need for moving external tracking hardware, and the described embodiments are capable of being used in confined spaces since line of sight to external tracking hardware is not required.

With regard to articulating arm measurement devices, the described embodiments provide an advantage since an object can be scanned without moving or setting up a large, articulating arm measurement system. Additionally, a large object can be scanned without stopping to move the articulating arm measurement system. A laser scanning device allows for measurement to occur at a much higher resolution than can be accomplished with an articulating arm measurement system. Further, an articulating arm measurement system requires the probe to be touched to each point to take a measurement which may prevent measurements in tight spaces. A laser scanner may be able to make such measurements.

In summary, the described embodiments reduce the amount of time needed to measure parts for inspection or reverse engineering as well as allowing for the creation of detailed, as-built three dimensional models of parts and assemblies. Such as-built models are utilized with a variation analysis (VA) software package to identify areas driving variation and nonconformance leading to a targeted approach to cost reduction and process improvement. Also, part models are created when the part is received and the model used for VA. By performing VA when the part is received the probability of successful installation could be determined and any required fixes could be identified prior to attempting installation. Identifying likelihood of successful installation and areas of rework early would result in reduced rework time, reduced nonconformance cost, and an overall increase in product quality.

The embodiments are useful as a reverse engineering tool which is valuable to support, maintenance, and engineering groups. Since this device is portable and requires little setup or cleanup time it could be used to rapidly generate three dimensional digital models of parts that have no engineering definition or are defined by two dimensional blueprints.

The described embodiments are further useful for scanning damaged parts to assist in determining how the damage occurred, document the location and extent of the damage, and estimate the cost of repair.

As described herein, a camera based system is utilized to determine a location and orientation (pose) of a distance measuring device with respect to the camera, and the distance measuring device is used to provide distance measurements to an object. The transformation of this data with respect to a fixed point and the combination of this measurement data is utilized to create local measurements that represent points on the surface of the object without the use of target trackers. Such a system and method provides an alternative to known time consuming and potentially inaccurate manual measurements, measurements that involve tracking targets applied to the object to calculate the device pose, and non- laser articulating arm measurement devices.

The embodiments provide a capability to rapidly and accurately create three dimensional digital representations of any size physical objects by combining a series of locating measurements and posing data (location and orientation) without the use of tracking targets or external tracking hardware. Such a system includes an optical imaging device for determining at least one location and orientation of a distance measuring device, the distance measuring device for measuring the distance of to a surface of the object, and, a processor for combining the location and orientation data and distance data.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for generating surface data defining a position and location of an object, said system comprising:
   a non-contact measuring device for measuring the location of one or more points on a surface of an object with respect to the measuring device;
   an optical imaging device for capturing image information; and
   a processor programmed to:
   use the captured image information to determine location and orientation data for both the measuring device and the optical imaging device with respect to a coordinate system associated with a fixed point in space;
   receive location measurement data from said measuring device; and
   combine the location and orientation data with the location measurement data to generate surface data for the object.

2. The measurement system of claim 1 wherein said non-contact measuring device comprises one of a laser rangefinder, a LIDAR (Light Distancing and Ranging) device, a laser line scanner, a LADAR (Laser Distancing and Ranging) device, and an ultrasonic rangefinder.

3. The measurement system of claim 1 wherein said optical imaging device comprises a digital camera capable of acquiring at least one of still images and video images.

4. The measurement system of claim 1 wherein to combine location and orientation data with the location measurement data to generate surface data, said processor is programmed to generate located distance measurements that define points on a surface of the object.

5. The measurement system of claim 1 wherein to combine location and orientation data with the location measurement data to generate surface data, said processor is programmed to generate a three-dimensional representation of the object based on location measurement data relating to multiple locations and orientations of said measuring device with respect to a coordinate system associated with a fixed point in space.

6. The measurement system of claim 5 wherein to generate the three-dimensional representation of the object said processor is programmed to generate a point cloud containing the location measurement data that represents one or more surfaces of the object.

7. The measurement system of claim 1 wherein to determine location and orientation data for both the measuring device and the optical imaging device, said processor is programmed to:
   determine a position and orientation of said imaging device with respect to a coordinate system associated with a fixed point in space; and
   determine a position and orientation of said measuring device with respect to said imaging device.

8. The measurement system of claim 7 wherein said processor is programmed to:
   transform location measurement data from a coordinate system associated with said measuring device to a coordinate system associated with said imaging device;
   transform measurement data from a coordinate system associated with said imaging device to a coordinate system associated with the fixed point in space.

9. The measurement system of claim 7 wherein said processor is programmed to:
   transform location measurement data from a coordinate system associated with said measuring device to a coordinate system associated with said imaging device according to:

$$A = \begin{bmatrix} R_{c11} & R_{c12} & R_{c13} & t_{cx} \\ R_{c21} & R_{c22} & R_{c23} & t_{cy} \\ R_{c31} & R_{c32} & R_{c33} & t_{cz} \\ 0 & 0 & 0 & 1 \end{bmatrix},$$

where $R_{cij}$ represents rotation values between the coordinate system associated with said measuring device and the coordinate system associated with said imaging device, and $t_{cl}$ represents translation values between the coordinate system associated with said measuring device and the coordinate system associated with said imaging device; and
transform measurement data from a coordinate system associated with said imaging device to a coordinate system associated with the fixed point in space according to:

$$B = \begin{bmatrix} R_{o11} & R_{o12} & R_{o13} & t_{ox} \\ R_{o21} & R_{o22} & R_{o23} & t_{oy} \\ R_{o31} & R_{o32} & R_{o33} & t_{oz} \\ 0 & 0 & 0 & 1 \end{bmatrix},$$

where $R_{oij}$ represents rotation values between the coordinate system associated with said imaging device and the coordinate system associated with the fixed point in space and $t_{ol}$ represents translation values between the coordinate system associated with said imaging device and the coordinate system associated with the fixed point in space.

10. The measurement system of claim 9 wherein to combine the location and orientation data with the distance measurement data to generate surface data for the object, said processor is programmed to convert the distance and direction measurements to one or more points on the surface of the object to vector notation of the form:

$$\overline{m} = \begin{bmatrix} x \\ y \\ z \\ 1 \end{bmatrix},$$

where x, y, and z represent the location of the point on the surface of the object in the coordinate system associated with said measuring device;
convert the measurement vector, $\overline{m}$, in the coordinate system associated with said measuring device to the coordinate system associated with said imaging device according to $\overline{m}' = A\overline{m}$, where $\overline{m}$ represents the measurement vector in the coordinate system associated with said measuring device, A represents the transformation matrix from the coordinate system associated with said measuring device to the coordinate system associated with said imaging device, and $\overline{m}'$ represents the measurement vector in the coordinate system associated with said imaging device; and
convert measurement vector, $\overline{m}'$ in the coordinate system associated with said imaging device to the coordinate system associated with the fixed point in space according to $\overline{o} = B\overline{m}'$, where $\overline{m}'$ represents the measurement vector in the coordinate system associated with said imaging device, B represents the transformation matrix from the coordinate system associated with said imaging device to the coordinate system associated with the fixed point in space, and $\overline{o}$ represents the measurement vector in the coordinate system associated with the fixed point in space.

11. A method for generating three axis surface data for an object, said method comprising:
    determining location and orientation data for both a location measuring device and an optical imaging device with respect to a coordinate system associated with the fixed point in space;
    receiving data indicative of location measurements between the location measuring device and the object; and
    combining the data indicative of location measurements and the location and orientation data for the location measuring device and the optical imaging device to generate data representative of a surface of the object.

12. The method according to claim 11 wherein receiving data indicating a location and an orientation of the location measuring device comprises:
    acquiring at least one image of the object and the scene surrounding the object using the optical imaging device; and
    determining a location and an orientation for both optical imaging device and the distance measuring device based on the acquired at least one image.

13. The method according to claim 11 wherein combining the data indicative of location measurements and the location and orientation data for the location measuring device and the optical imaging device comprises combining the data indicative of location measurements and the location and orientation data for the location measuring device and the optical imaging device for a plurality of location measuring device locations and orientations.

14. The method according to claim 11 wherein combining the data indicative of location measurements and the location and orientation data for the location measuring device and the optical imaging device comprises generating a three-dimensional representation of the surface of the object based on location measurement data relating to multiple locations and orientations of the location measuring device with respect to the object.

15. The method according to claim 14 wherein generating a three-dimensional representation of the object comprises generating a point cloud containing data representative one or more surfaces of the object.

16. The method according to claim 11 wherein determining location and orientation data for both a location measuring device and an optical imaging device with respect to a coordinate system associated with the fixed point in space comprises:
   determining a position and orientation of the optical imaging device with respect to a coordinate system associated with the fixed point in space; and
   determining a position and orientation of the location measuring device with respect to the optical imaging device.

17. The method according to claim 16 wherein:
   determining a position and orientation of the location measuring device with respect to the optical imaging device comprises transforming measurement data from a coordinate system associated with the location measuring device to a coordinate system associated with the optical imaging device; and
   transforming measurement data from a coordinate system associated with the optical imaging device to a coordinate system associated with the fixed point in space.

18. The method according to claim 16 wherein determining a position and orientation of the optical imaging device with respect to a point in space comprises transforming a position of the optical imaging device from a coordinate system associated with the optical imaging device to a coordinate system associated with the fixed point in space.

19. The method according to claim 16 wherein:
   determining a position and orientation of the location measurement data with respect to the optical imaging device comprises transforming location measurement data from a coordinate system associated with the location measuring device to a coordinate system associated with the optical imaging device according to:

$$A = \begin{bmatrix} R_{c11} & R_{c12} & R_{c13} & t_{cx} \\ R_{c21} & R_{c22} & R_{c23} & t_{cy} \\ R_{c31} & R_{c32} & R_{c33} & t_{cz} \\ 0 & 0 & 0 & 1 \end{bmatrix},$$

where $R_{cij}$ represents rotation values between the coordinate system associated with the location measuring device and the coordinate system associated with the optical imaging device, and $t_{cj}$ represents translation values between the coordinate system associated with the location measuring device and the coordinate system associated with the optical imaging device; and
   determining a position and orientation of the location measurement data with respect to a coordinate system associated with a fixed point in space comprises transforming location measurement data from a coordinate system associated with the optical imaging device to a coordinate system associated with the fixed point in space according to:

$$B = \begin{bmatrix} R_{o11} & R_{o12} & R_{o13} & t_{ox} \\ R_{o21} & R_{o22} & R_{o23} & t_{oy} \\ R_{o31} & R_{o32} & R_{o33} & t_{oz} \\ 0 & 0 & 0 & 1 \end{bmatrix},$$

where $R_{oij}$ represents rotation values between the coordinate system associated with the optical imaging device and the coordinate system associated with the fixed point in space and $t_{oj}$ represents translation values between the coordinate system associated with the optical imaging device and the coordinate system associated with the fixed point in space.

20. The method according to claim 16 wherein combining the data indicative of location measurements and the location and orientation data for the location measuring device and the optical imaging device to generate data representative of a surface of the object comprises:
   converting the distance and direction measurements to one or more points on the surface of the object to vector notation of the form:

$$\overline{m} = \begin{bmatrix} x \\ y \\ z \\ 1 \end{bmatrix},$$

where x, y, and z represent the location of the point on the surface of the object in a coordinate system associated with the distance measuring device;
   converting the measurement vector, $\overline{m}$, in the coordinate system associated with the location measuring device to the coordinate system associated with the imaging device according to $\overline{m}' = A\overline{m}$, where $\overline{m}$ represents the measurement vector in the coordinate system associated with the location measuring device, A represents the transformation matrix from the coordinate system associated with the location measuring device to the coordinate system associated with the imaging device, and $\overline{m}'$ represents the measurement vector in the coordinate system associated with the imaging device; and
   converting the measurement vector, $\overline{m}'$ in the coordinate system associated with the imaging device to the coordinate system associated with the fixed point in space according to $\overline{o} = B\overline{m}'$ where $\overline{m}'$ represents the measurement vector in the coordinate system associated with the imaging device, B represents the transformation matrix from the coordinate system associated with the imaging device to the coordinate system associated with the fixed point in space, and $\overline{o}$ represents the measurement vector in the coordinate system associated with the fixed point in space.

* * * * *